United States Patent
Gao et al.

(10) Patent No.: US 12,368,368 B2
(45) Date of Patent: Jul. 22, 2025

(54) ISOLATED RESONANT CONVERSION CONTROL METHOD, APPARATUS AND SYSTEM, AND READABLE STORAGE MEDIUM BASED ON SWITCHING FREQUENCY OF INPUT-SIDE SWITCH TRANSISTOR

(71) Applicant: CONTEMPORARY AMPEREX TECHNOLOGY (HONG KONG) LIMITED, Hong Kong (CN)

(72) Inventors: Jinfeng Gao, Ningde (CN); Weichen He, Ningde (CN); Yuan Yao, Ningde (CN); Yu Yan, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 274 days.

(21) Appl. No.: 18/295,925

(22) Filed: Apr. 5, 2023

(65) Prior Publication Data
US 2023/0238874 A1    Jul. 27, 2023

Related U.S. Application Data

(63) Continuation of application No. PCT/CN2021/128793, filed on Nov. 4, 2021.

(30) Foreign Application Priority Data

Dec. 24, 2020   (CN) .................. 202011544498.X

(51) Int. Cl.
*H02M 3/00* (2006.01)
*H02M 1/00* (2006.01)

(52) U.S. Cl.
CPC ....... *H02M 1/0054* (2021.05); *H02M 1/0009* (2021.05); *H02M 3/01* (2021.05)

(58) Field of Classification Search
CPC ..... G05F 1/00; G05F 1/10; G05F 1/12; G05F 1/46; G05F 1/455; G05F 1/45;
(Continued)

(56) References Cited

U.S. PATENT DOCUMENTS 9,490,704 B2 * 11/2016 Jang .................. H02M 3/33571
11,264,913 B2 * 3/2022 Skinner ............... H02M 1/4241
(Continued)

FOREIGN PATENT DOCUMENTS

CN    101707440 A    5/2010
CN    103023335 A    4/2013
(Continued)

OTHER PUBLICATIONS

The China National Intellectual Property Administration (CNIPA) The First Office Action for Chinese Application 202011544498.X 10 Pages (With Translation).
(Continued)

Primary Examiner — Sean Kayes
Assistant Examiner — Nusrat Quddus
(74) Attorney, Agent, or Firm — ANOVA LAW GROUP, PLLC

(57) ABSTRACT

An isolated resonant conversion control apparatus includes a voltage and current obtaining unit configured to obtain an output voltage and an output current of an output-side switch transistor of an isolated resonant conversion unit, and a processing unit configured to calculate a switching frequency of an input-side switch transistor of the isolated resonant conversion unit based on the output voltage and the output current, obtain a turn-on offset time and a turn-off offset time of the output-side switch transistor relative to the input-side switch transistor based on the switching frequency of the input-side switch transistor, obtain a duty ratio of a second driving signal based on a duty ratio of a first
(Continued)

driving signal, the turn-on offset time, and the turn-off offset time, and generate the second driving signal based on the switching frequency and the duty ratio of the second driving signal.

14 Claims, 4 Drawing Sheets

(58) Field of Classification Search
CPC ... G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H02M 3/22; H02M 1/08; H02M 1/36; H02M 3/24; H02M 3/325; H02M 3/335; H02M 3/28; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/1584; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H05B 39/048; B23K 11/24; H04B 2215/069; Y02B 70/1491; H02J 3/46; H02J 3/38

See application file for complete search history.

(56) References Cited

U.S. PATENT DOCUMENTS

| | | | |
|---|---|---|---|
| 2013/0314951 A1 | 11/2013 | Harrison | |
| 2018/0234007 A1* | 8/2018 | Xu | H02M 3/33523 |
| 2021/0226543 A1* | 7/2021 | Liang | H02M 3/33573 |

FOREIGN PATENT DOCUMENTS

| | | | |
|---|---|---|---|
| CN | 109149948 A | 1/2019 | |
| CN | 109245593 A | 1/2019 | |
| CN | 109525119 A | 3/2019 | |
| CN | 110198126 A | 9/2019 | |

OTHER PUBLICATIONS

The World Intellectual Property Organization (WIPO) International Search Report and Written opinion for PCT/CN2021/128793 Dec. 20, 2021 13 pages (including English translation).
The China National Intellectual Property Administration (CNIPA) The Notice of Grant Of Invention Patent Rights Chinese Application 202011544498.X May 31, 2023 2 Pages (With Translation).
The European Patent Office (EPO) The Extended European Search Report for Application No. 21908888.7 Feb. 21, 2024, 8 Pages.

* cited by examiner

ISOLATED RESONANT CONVERSION CONTROL METHOD, APPARATUS AND SYSTEM, AND READABLE STORAGE MEDIUM BASED ON SWITCHING FREQUENCY OF INPUT-SIDE SWITCH TRANSISTOR

CROSS-REFERENCE TO RELATED APPLICATIONS

The present application is a continuation of International Application No. PCT/CN2021/128793, filed on Nov. 4, 2021, which claims priority to Chinese patent application no. 202011544498X, entitled "ISOLATED RESONANT CONVERSION CONTROL METHOD, APPARATUS AND SYSTEM, AND READABLE STORAGE MEDIUM", and filed on Dec. 24, 2020, both of which are incorporated herein by reference in their entirety.

TECHNICAL FIELD

The present application relates to the technical field of electronic circuits, and in particular, to an isolated resonant conversion control method, apparatus and system, a readable storage medium.

BACKGROUND ART

Bidirectional full-bridge resonant direct-current converter is an isolated resonant converter. In order to implement synchronous rectification control of the isolated resonant converter, a digital control strategy may be used. Existing digital control methods are mainly a table lookup method, in which a turn-on time and an turn-off time of a switch transistor are recorded experimentally, and a controller is then allowed to determine an action time for a synchronous transistor based on the current working state by means of curve fitting.

Such a method makes it easy to analyze the turn-on time and the turn-off time, but difficult to ensure the accuracy of analysis results, resulting in a low control accuracy and thus a low efficiency of the converter.

SUMMARY

An object of the present application is to provide an isolated resonant conversion control method, apparatus and system, and a readable storage medium, which are used to improve the accuracy of a control strategy, and then improve the efficiency of a converter.

In a first aspect, the present application provides an isolated resonant conversion control method, the method including: obtaining an output voltage and an output current of an output-side switch transistor of an isolated resonant conversion unit; calculating a switching frequency of an input-side switch transistor of the isolated resonant conversion unit based on the output voltage and the output current; obtaining, based on the switching frequency of the input-side switch transistor, a turn-on offset time and a turn-off offset time of the output-side switch transistor relative to the input-side switch transistor; obtaining a duty ratio of a second driving signal based on a duty ratio of a first driving signal, the turn-on offset time and the turn-off offset time, where the first driving signal is used to drive the input-side switch transistor; and generating the second driving signal based on the switching frequency of the input-side switch transistor and the duty ratio of the second driving signal, and driving the output-side switch transistor of the isolated resonant conversion unit by using the second driving signal.

Compared with the prior art, in the present application, the turn-on offset time and the turn-off offset time of the output-side switch transistor relative to the input-side switch transistor are obtained by calculating the switching frequency of the input-side switch transistor; and then, the duty ratio of the first driving signal is converted based on the turn-on offset time and the turn-off offset time, to obtain the second driving signal, such that the second driving signal implements driving of the output-side switch transistor, thereby implementing synchronous driving of the input-side switch transistor and the output-side switch transistor. The turn-on offset time and the turn-off offset time is related to the switching frequency of the input-side switch transistor, and the switching frequency is related to the output voltage and the output current of the output-side switch transistor, so that accurate analysis of the turn-on time and the turn-off time is implemented, that is, accurate analysis of an on relationship between the output-side switch transistor and the input-side switch transistor is implemented, so as to improve the accuracy of a synchronization control strategy, thereby improving the efficiency of the converter (i.e., the conversion unit). In addition to the improvement in the efficiency of the converter, the temperature of the switch transistors can also be reduced.

In conjunction with the first aspect, in a first possible implementation of the first aspect, the obtaining a duty ratio of a second driving signal based on a duty ratio of a first driving signal, the turn-on offset time and the turn-off offset time includes: obtaining a turn-on time point and a turn-off time point for the first driving signal based on the duty ratio of the first driving signal; obtaining a turn-on time point for the second driving signal based on the turn-on time point of the first driving signal and the turn-on offset time; obtaining a turn-off time point for the second driving signal based on the turn-off time point of the first driving signal and the turn-off offset time; and obtaining the duty ratio of the second driving signal based on the turn-on time point of the second driving signal and the turn-off time point of the second driving signal.

In the present application, the turn-on time point of the second driving signal is determined by the turn-on offset time and the turn-on time point of the first driving signal, and the turn-off time point of the second driving signal is determined by the turn-off offset time and the turn-off time point of the first driving signal; and the duty ratio of the second driving signal can then be accurately determined based on the turn-on time point and the turn-off time point, thereby implementing effective determination of the second driving signal.

In conjunction with the first aspect, in a second possible implementation of the first aspect, the calculating a switching frequency of an input-side switch transistor based on the output voltage and the output current comprises: calculating the switching frequency of the input-side switch transistor based on the output voltage and the output current by means of proportional-integral feedback control.

In the embodiment of the present application, the effective calculation of the switching frequency of the input-side switch transistor can be implemented based on the output voltage and the output current in combination with the proportional-integral feedback control.

In conjunction with the first aspect and the first two possible implementations of the first aspect, in a third possible implementation of the first aspect, the obtaining, based on the switching frequency of the input-side switch transistor, a turn-on offset time and a turn-off offset time of the output-side switch transistor relative to the input-side switch transistor includes: when the output current is greater than a synchronization start threshold current, obtaining, based on the switching frequency of the input-side switch transistor, a turn-on offset time and a turn-off offset time of the output-side switch transistor relative to the input-side switch transistor.

In the present application, the output current is determined by setting a threshold current. Only when the output current is greater than the threshold current, the turn-on offset time and the turn-off offset time are determined. In other words, only when the output current meets the condition of the threshold current, the synchronization control strategy for the input-side switch transistor and the output-side switch transistor is implemented. In this way, flexible synchronization control is implemented depending on different working conditions.

In conjunction with the third possible implementation of the first aspect, in a fourth possible implementation of the first aspect, the method further includes: determining the synchronization start threshold current based on an on loss of a body diode connected in parallel with the output-side switch transistor and a switching loss of the output-side switch transistor.

In the present application, the determination of the synchronization start threshold current is implemented by comprehensive analysis of the on loss and the switching loss. Therefore, the consideration of the on loss and the switching loss in a synchronous rectification control strategy can make it possible to reduce the switching loss and thus the temperature of the switch transistors.

In conjunction with the fourth possible implementation of the first aspect, in a fifth possible implementation of the first aspect, the determining the synchronization start threshold current based on an on loss of a body diode connected in parallel with the output-side switch transistor and a switching loss of the output-side switch transistor includes: obtaining $I_d$ if $P_1=P_2$, and use $I_d$ as the synchronization start threshold current, where $P_1$ and $P_2$ are respectively the on loss of the body diode and the switching loss of the output-side switch transistor, $$P_1 = \frac{1}{T_t}\int_0^{dT_t} I_d^2 dt \times R_{on},$$

and $P_2=\frac{1}{2}\times T_s \times V_d \times I_d \times f$, where $T_t$ is an on time of the body diode, $R_{on}$ is a forward on resistance of the body diode, $I_d$ is a current flowing through the output-side switch transistor, $T_s$ is a time at which the body diode and the output-side switch transistor are simultaneously on, $V_d$ is an on voltage of the output-side switch transistor, and f is a switching frequency of the output-side switch transistor.

In the present application, the effective analysis of the on loss and the switching loss is implemented by calculating the parameters related to the body diode and the parameters related to the output-side switch transistor, and the finally determined threshold current can then facilitate effective reduction in the loss of the switch transistors.

In conjunction with the third possible implementation of the first aspect, in a sixth possible implementation of the first aspect, the obtaining, based on the switching frequency of the input-side switch transistor, a turn-on offset time and a turn-off offset time of the output-side switch transistor relative to the input-side switch transistor further includes: when the output current is less than a synchronization end threshold current, stopping driving the output-side switch transistor of the isolated resonant conversion unit, where the synchronization end threshold current is less than the synchronization start threshold current.

In the present application, by means of the synchronization end threshold current, flexible synchronization control is implemented depending on different working conditions. In addition, when a magnitude of a current is between those of the synchronization start threshold current and the synchronization end threshold current, hysteresis control can be implemented to reduce an impact on synchronization control when the current is switched near the synchronization start threshold current.

In conjunction with the sixth possible implementation of the first aspect, in a seventh possible implementation of the first aspect, a current difference between the synchronization start threshold current and the synchronization end threshold current is less than 1 ampere.

In the present application, the current difference between the synchronization start threshold current and the synchronization end threshold current being less than 1 ampere can make it possible to more effectively reduce an impact on synchronization control when a current is switched near the synchronization start threshold current.

In a second aspect, the present application provides an isolated resonant conversion control apparatus, the control apparatus including various functional modules for implementing the method described in the first aspect and any of the possible implementations of the first aspect.

In a third aspect, the present application provides an isolated resonant conversion control system, the system including: an isolated resonant conversion unit, which comprises an input-side switch transistor and an output-side switch transistor; and an isolated resonant conversion control apparatus as described in the second aspect, which is configured to drive the input-side switch transistor and the output-side switch transistor.

In a fourth aspect, the present application provides a computer-readable storage medium storing instructions, where when the instructions are executed by a processor, an isolated resonant conversion control method as described in the first aspect and any of the possible implementations of the first aspect is performed.

BRIEF DESCRIPTION OF THE DRAWINGS

In order to more clearly illustrate the technical solutions of the embodiments of the present application, the drawings to be used in the description of the embodiments of the present application will be described briefly below. Obviously, the drawings in the following description are merely some embodiments of the present application. For those skilled in the art, other drawings can also be obtained according to these drawings without any creative effort.

Figure 1:
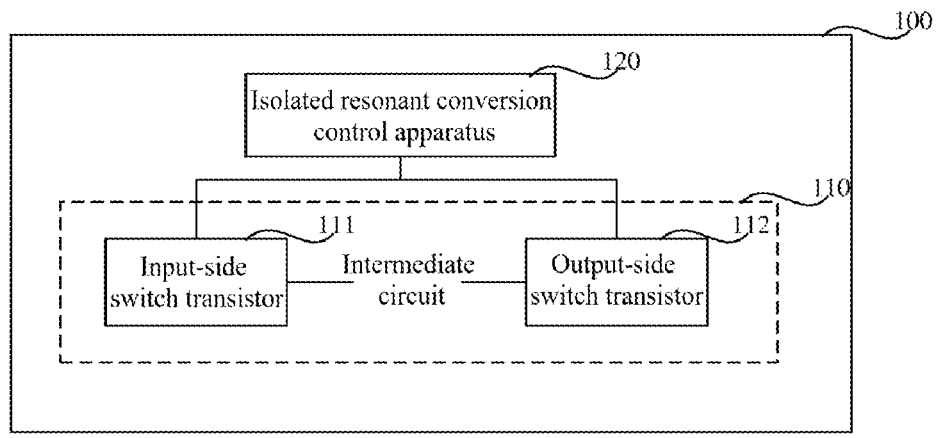
FIG. 1 is a schematic structural diagram of a control system disclosed in an embodiment of the present application.

In the accompanying drawings, the figures are not drawn to scale.

List of reference numerals: 100—Control system; 110—Isolated resonant conversion unit; 111—Input-side switch transistor; 112—Output-side switch transistor; 120—Isolated resonant conversion control apparatus; 121—Voltage and current obtaining unit; and 122—Processing unit.

DETAILED DESCRIPTION OF EMBODIMENTS

The implementations of the present application will be further described in detail below in conjunction with the accompanying drawings and embodiments. The following detailed description of the embodiments and the accompanying drawings are used to illustrate the principle of the present application by way of example, but shall not be used to limit the scope of the present application. That is, the present application is not limited to the described embodiments.

In the description of the present application, it should be noted that "a plurality of" means at least two, unless otherwise specified. the orientation or a position relationship indicated by the terms "upper", "lower", "left", "right", "inner", "outer", etc. is for convenience of describing the present application and simplifying the description only, rather than indicating or implying that the device or element referred to must have a particular orientation or be constructed and operated in a particular orientation, and therefore should not be construed as a limitation on the present application. In addition, the terms "first", "second", "third", etc. are used for descriptive purposes only, and shall not be construed as indicating or implying relative importance. The term "perpendicular" does not mean being perpendicular in the strict sense, but within an allowable range of errors. The term "parallel" does not mean being parallel in the strict sense, but within an allowable range of errors.

The orientation terms in the following description all indicate directions shown in the drawings, but do not limit the specific structure in the present application. In the description of the present application, it should also be noted that, the term "mount", "engage", and "connect" should be interpreted in the broad sense unless explicitly defined and limited otherwise, which, for example, may mean a fixed connection, a detachable connection or an integral connection; or may mean a direct connection, or an indirect connection by means of an intermediary. For those of ordinary skill in the art, the specific meaning of the terms mentioned above in the present application can be construed according to specific circumstances.

As shown in FIG. 1, it is a schematic diagram of a control system 100 provided in an embodiment of the present application. The control system 100 includes an isolated resonant conversion unit 110 and an isolated resonant conversion control apparatus 120.

The isolated resonant conversion unit 110 may be various types of direct-current converters (such as bidirectional full-bridge resonant direct-current converters), or other isolated resonant converters (such as high-gain isolated direct-current converters). The isolated resonant conversion unit 110 includes an input-side switch transistor 111 and an output-side switch transistor 112.

With a bidirectional full-bridge resonant direct-current converter as an example, the bidirectional full-bridge resonant direct-current converter can implement conversion from Gird to Vehicle (G2V) or from Vehicle to Gird (V2G). When in a G2V mode, a switch transistor on the grid side is the input-side switch transistor 111, and a switch transistor on the vehicle side is the output-side switch transistor 112; and When in a V2G mode, a switch transistor on the vehicle side is the input-side switch transistor 111, and a switch transistor on the grid side is the output-side switch transistor 112.

Driving control for turning on or turning off the input-side switch transistor 111 and the output-side switch transistor 112 can be implemented by respective driving signals for the input-side switch transistor 111 and the output-side switch transistor 112. During synchronous rectification, the input-side switch transistor 111 has a frequency of the driving signal that is the same as a frequency of the driving signal of the output-side switch transistor 112, and the input-side switch transistor has a turn-on time and a turn-off time that are respectively the same as or different from a turn-on time and a turn-off time of the output-side switch transistor. For example: the turn-on time of the output-side switch transistor 112 is delayed with respect to the turn-on time of the input-side switch transistor 111.

Figure 2:
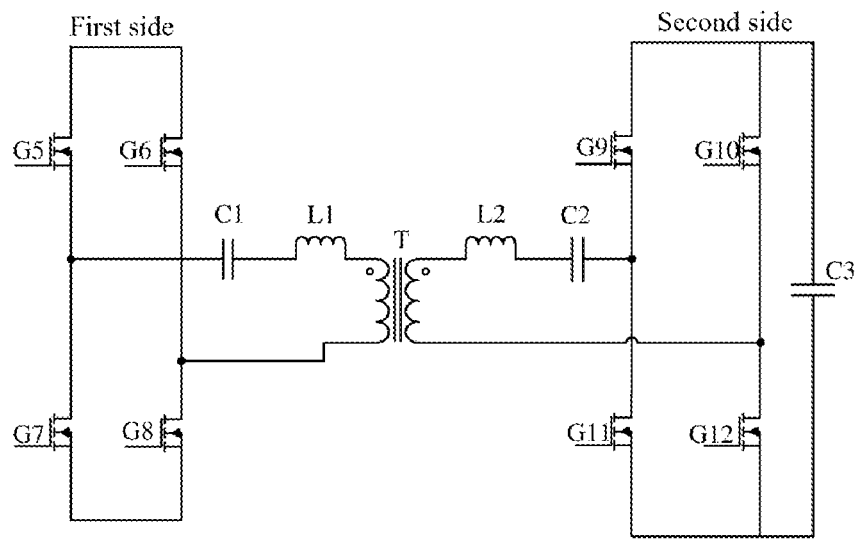
FIG. 2 is a topological graph of a circuit for a bidirectional full-bridge resonant direct-current converter disclosed in an embodiment of the present application.

With reference to FIG. 2, it is a topological graph of a circuit for a bidirectional full-bridge resonant direct-current converter provided in an embodiment of the present application. In FIG. 2, the circuit includes eight switch transistors. The switch transistors on a first side are: G5, G6, G7, and G8; and the switch transistors on a second side are: G9, G10, G11, and G12. G5 has a synchronous driving relationship with G9, G6 has a synchronous driving relationship with G10, G7 has a synchronous driving relationship with G11, and G8 has a synchronous driving relationship with G12. When in a G2V mode, G5, G6, G7, and G8 are input-side switch transistors 111, and G9, G10, G11, and G12 are output-side switch transistors 112. When in a V2G mode, G9, G10, G11, and G12 are input-side switch transistors 111, and G5, G6, G7, and G8 are output-side switch transistors 112. In FIG. 2, the circuit further includes C1, C2, and C3, representing capacitors; L1 and L2, representing inductors; and T, representing a transformer.

A switch transistor on a primary side of the transformer may also be called a primary-side switch transistor; and a switch transistor on a secondary side of the transformer may also be called a secondary-side or synchronous switch transistor. A primary side and a secondary side of the transformer depend on a transformation relationship in the entire topological circuit. An input side is the primary side, and an output side is the secondary side.

In subsequent embodiments, proper reference may be made to the topological structure of the circuit shown in FIG. 2 for description of the isolated resonant conversion control method, to give an example for ease of understanding.

The isolated resonant conversion control apparatus 120 is used to implement the isolated resonant conversion control method provided in the embodiments of the present application, and then implement synchronous driving control of the input-side switch transistor 111 and the output-side switch transistor 112. In the embodiments of the present application, the implementation of the isolated resonant conversion control method is first described, and for the implementation of the isolated resonant conversion control apparatus 120, reference is made to the implementation of the isolated resonant conversion control method.

Figure 3:
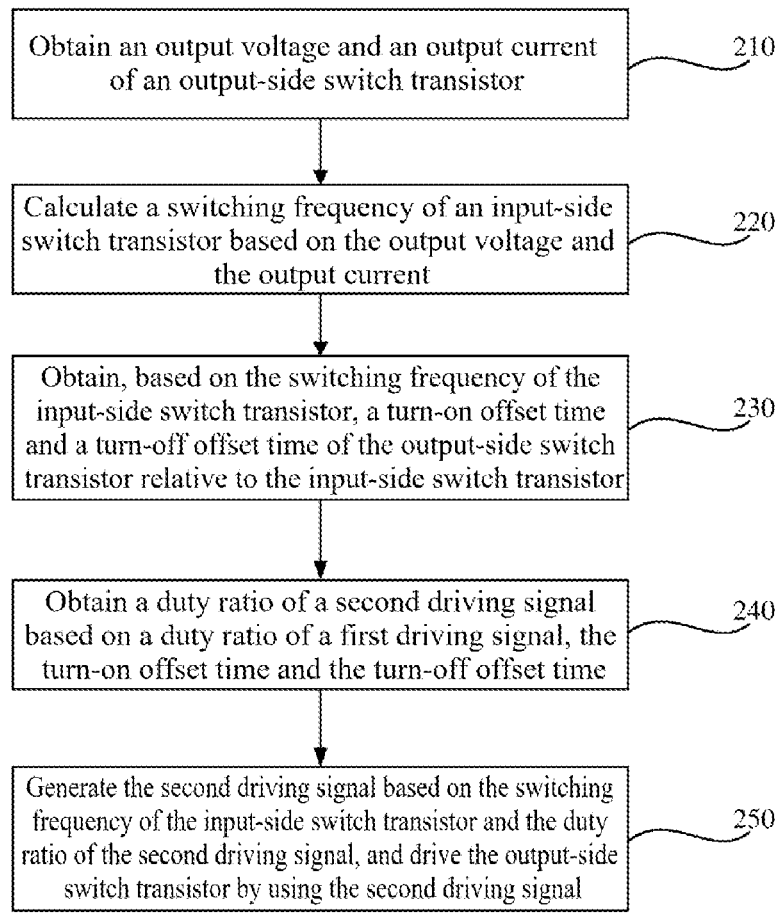
FIG. 3 is a flowchart of an isolated resonant conversion control method disclosed in an embodiment of the present application.

With reference to FIG. 3, it is a flowchart of an isolated resonant conversion control method provided in an embodiment of the present application. The control method includes: steps 210, 220, 230, 240, and 250.

In step 210: An output voltage and an output current of an output-side switch transistor 112 are obtained.

In step 220: A switching frequency of an input-side switch transistor 111 is calculated based on the output voltage and the output current.

In step 230: Based on the switching frequency of the input-side switch transistor 111, a turn-on offset time and a turn-off offset time of the output-side switch transistor 112 relative to the input-side switch transistor 111 are obtained.

In step 240: A duty ratio of a second driving signal is obtained based on a duty ratio of a first driving signal, the turn-on offset time and the turn-off offset time. The first driving signal is used to drive the input-side switch transistor 111.

In step 250: The second driving signal is generated based on the switching frequency of the input-side switch transistor and the duty ratio of the second driving signal, and the output-side switch transistor 112 is driven by using the second driving signal.

By means of the control method, accurate analysis of the turn-on time and the turn-off time is implemented, that is, accurate analysis of an on relationship between the output-side switch transistor 112 and the input-side switch transistor 111 is implemented, so as to improve the accuracy of a synchronization control strategy, thereby improving the efficiency of a converter (i.e., a conversion unit). In addition to the improvement in the efficiency of the converter, the temperature of the switch transistors (including the input-side switch transistor 111 and the output-side switch transistor 112) can also be reduced.

Next, the implementation of steps 210 to 250 will be explained in detail.

In step 210, the output voltage and the output current of the output-side switch transistor 112 are obtained. It can be understood that it is possible for a control module (i.e., the isolated resonant conversion control apparatus 120) for the isolated resonant conversion unit 110 to collect voltage and current information from a circuit in real time. Therefore, in step 210, the control module can directly collect the output voltage and the output current of the output-side switch transistor 112. With the bidirectional full-bridge resonant direct-current converter shown in FIG. 2 as an example, assuming that the input-side switch transistor 111 is G5, then the output-side switch transistor 112 at this time is G9, and an output voltage and an output current of G9 can be directly obtained in step 210.

In the embodiments of the present application, the output voltage and the output current contribute to calculation of the switching frequency of the input-side switch transistor 111, and the switching frequency of the input-side switch transistor 111 is the same as the switching frequency of the output-side switch transistor 112. Therefore, as another optional implementation, in step 210, an output voltage and an output current of the input-side switch transistor 111 can alternatively be obtained, or other parameter information that can be used to determine the switching frequency of the input-side switch transistor 111 can be obtained, and the switching frequency is then calculated based on the parameter information.

After the output voltage and the output current of the output-side switch transistor 112 are obtained in step 210, the switching frequency of the input-side switch transistor 111 is calculated, in step 220, based on the output voltage and the output current.

As an optional implementation, step 220 includes: calculating the switching frequency of the input-side switch transistor 111 based on the output voltage and the output current by means of proportional-integral feedback control. The proportional-integral feedback control is a proportional-integral based control method. In this control method, there is a corresponding relationship between the output voltage and output current and the input-side switch transistor 111. Based on the relationship, the switching frequency can be determined when the output voltage and the output current are known.

It can be known from the implementation of step 210 that, if other parameter information is obtained in step 210, a corresponding switching frequency calculation method can be selected in combination with the parameter information in step 220, which is not limited in the embodiments of the present application.

After the switching frequency of the input-side switch transistor 111 is determined in step 220, the turn-on offset time and the turn-off offset time of the output-side switch transistor 112 relative to the input-side switch transistor can be obtained based on the switching frequency in step 230.

Still with FIG. 2 as an example, assuming that the turn-on offset time is t1 and the turn-off offset time is t2, and the input-side switch transistor 111 is G5 and the output-side switch transistor 112 is G9, then, t1 being positive indicates that G9 is turned on later than G5; t1 being negative indicates that G9 is turned on earlier than G5; and t1 being 0 indicates that G9 and G5 are turned on at the same time; and t2 being positive indicates that G9 is turned off later than G5; t2 being negative indicates that G9 is turned off earlier than G5; and t2 being 0 indicates that G9 and G5 are turned off at the same time.

As an optional implementation, obtaining the turn-on offset time and the turn-off offset time based on the switching frequency includes: obtaining the turn-on offset time and the turn-off offset time based on a preset relationship between a (turn-on or turn-off offset) time and the switching frequency.

For the relationship between the time and the switching frequency, simulation data and switching data may be analyzed to obtain a linear relationship between the turn-on or turn-off offset and the switching frequency. During analysis, it can be found that the linear relationship is not the same in different frequency ranges. Therefore, the frequency can be divided into several segments, and then, the turn-on offset times or the turn-off offset times within different frequency ranges are fitted with segmented functions.

Figure 4:
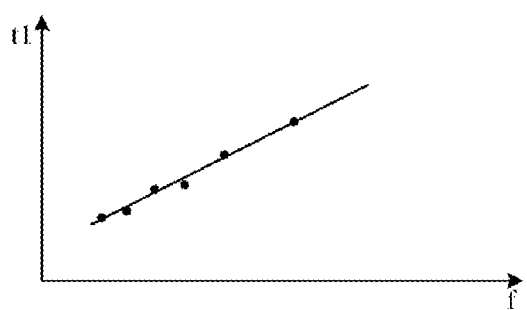
FIG. 4 is a schematic diagram of a fitted curve of frequency versus offset time disclosed in an embodiment of the present application.

An example, with reference to FIG. 4, it is a fitted linear relationship between turn-on offset time t1 and switching frequency f provided in the embodiment of the present application. The turn-on offset time t1 can be determined based on the fitted linear relationship shown in FIG. 4 and the known switching frequency. Similarly, turn-off offset time t2 is also obtained in the same way.

After the turn-on offset time and the turn-off offset time are obtained in step 230, a duty ratio of a second driving signal is generated, in step 240, based on a duty ratio of a first driving signal, the turn-on offset time and the turn-off offset time. The first driving signal is used to drive the input-side switch transistor 111.

As an optional implementation, step 240 includes: obtaining a turn-on time point and a turn-off time point for the first driving signal based on the duty ratio of the first driving signal; obtaining a turn-on time point for the second driving signal based on the turn-on time point of the first driving signal and the turn-on offset time; obtaining a turn-off time point for the second driving signal based on the turn-off time point of the first driving signal and the turn-off offset time; and obtaining the duty ratio of the second driving signal based on the turn-on time point of the second driving signal and the turn-off time point of the second driving signal.

Figure 5:
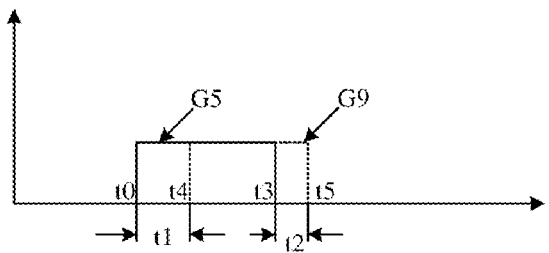
FIG. 5 is a schematic diagram of relationships between duty ratios of different driving signals disclosed in an embodiment of the present application.

For ease of understanding, with reference to FIG. 5, it is a schematic diagram of duty ratios of driving signals provided in an embodiment of the present application. In FIG. 5, a solid line part represents a duty ratio of a driving signal of G5 (the input-side switch transistor 111), and a dotted line part represents a duty ratio of a driving signal of G9 (the output-side switch transistor 112). Based on the duty ratio of G5, it can be determined that a turn-on time point of G5 is t0, and that a turn-off time point of G5 is t3. Assuming that a turn-on offset time is t1, by offsetting t0 by t1, it is determined that a turn-on time point of G9 is t4. Assuming that a turn-off offset time is t2, by offsetting t3 by t2, it is determined that a turn-off time point of G9 is t5. It is determined, from t2 and t4, that the duty ratio of the driving signal of G9 is the part shown by the dotted line in FIG. 5.

After the duty ratio of the second driving signal is determined in step 240, the second driving signal is generated based on the duty ratio and the output-side switch transistor 112 is driven by using the second drive signal in step 250. On the basis of driving the input-side switch transistor 111 by using the first driving signal, synchronous rectification (driving) control of the input-side switch transistor 111 and the output-side switch transistor 112 can be implemented.

In the embodiment of the present application, a corresponding determination condition may also be set for synchronous rectification control, so that the synchronous rectification control is performed only when the corresponding determination condition is met. Next, the determination condition corresponding to synchronous rectification will be described.

As an optional determination condition, in the embodiment of the present application, a synchronization start threshold current is set. In step 230, when an output current (in the isolated resonant conversion unit 110) (the output current obtained in step 210) is greater than the synchronization start threshold current, the turn-on offset time and the turn-off offset time of the output-side switch transistor 112 relative to the input-side switch transistor 111 are obtained based on the switching frequency of the input-side switch transistor 111.

In this implementation, the synchronization start threshold current, as a determination condition regarding whether synchronous rectification control is enabled, is a corresponding output current value at which the synchronous rectification control is started for the output-side switch transistor 112. When the output current is greater than the synchronization start threshold current, the synchronous rectification control is enabled.

With the determination condition, enablement of the synchronous rectification can be controlled more flexibly.

As another optional determination condition, in the embodiment of the present application, a synchronization end threshold current is also set. Therefore, when an output current (in the isolated resonant conversion unit 110) (the output current obtained in step 210) is less than the synchronization end threshold current, the output-side switch transistor 112 is stopped from being driven. The synchronization end threshold current is less than the synchronization start threshold current.

In this implementation, the synchronization end threshold current, as a determination condition regarding whether synchronous rectification control is enabled, is a corresponding output current value at which the synchronous rectification control is stopped for the output-side switch transistor 112. When the output current is less than the synchronization end threshold current, the synchronous rectification control is stopped.

With the determination condition, disablement of the synchronous rectification can be controlled more flexibly.

In the embodiments of the present application, the two determination conditions may be applied in combination, or only one of the determination conditions may be applied. When applied in combination, when a magnitude of a current is between those of the synchronization start threshold current and the synchronization end threshold current, hysteresis control can be implemented to reduce an impact on synchronization control when the current is switched near the synchronization start threshold current.

Figure 6:
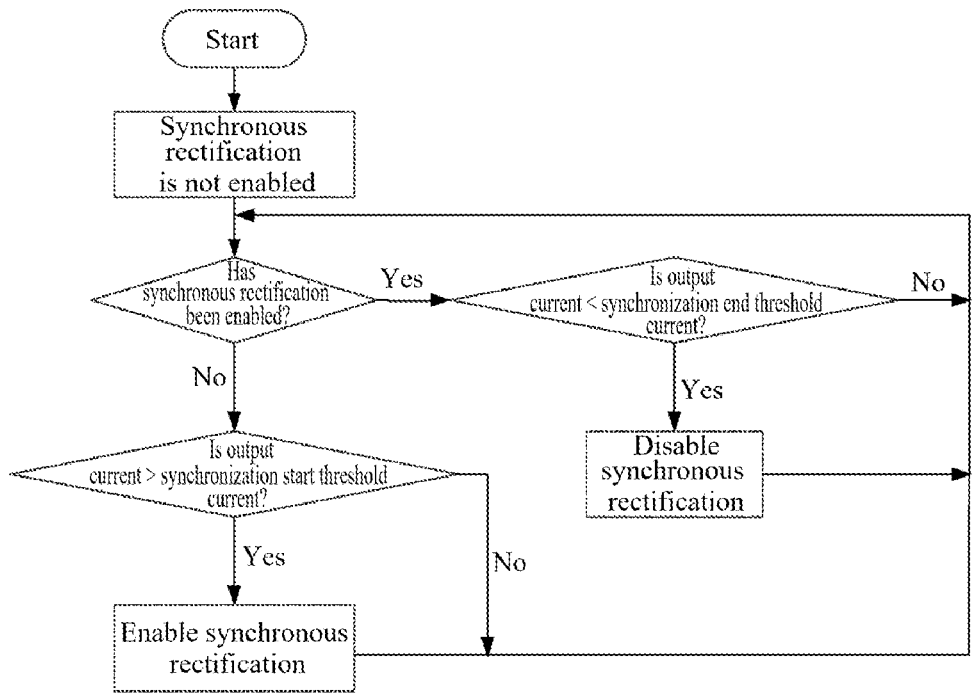
FIG. 6 is a schematic flowchart for control of synchronous rectification disclosed in an embodiment of the present application.

Assuming that both the two determination conditions are applied, with reference to FIG. 6, it is a flowchart of control of enablement or disablement of synchronous rectification. In FIG. 6, if a current state of synchronous rectification control indicates Disabled, it is determined whether the output current is greater than the synchronization start threshold current. If the output current is greater than the synchronization start threshold current, the synchronous rectification control is enabled, otherwise, a determination as to whether synchronous rectification is enabled is continued. If a current state of synchronous rectification control indicates Enabled, it is determined whether the output current is less than the synchronization end threshold current. If the output current is less than the synchronization end threshold current, the synchronous rectification control is disabled, otherwise, a determination as to whether synchronous rectification is enabled is continued.

In this embodiment of the present application, the synchronization start threshold current may be determined in combination with the on loss and the switching loss of the switch transistor, and the synchronization end threshold current may be determined in combination with the synchronization start threshold current.

As an optional implementation, the process of determining the synchronization start threshold current includes: determining the synchronization start threshold current based on an on loss of a body diode connected in parallel with the output-side switch transistor 112 and a switching loss of the output-side switch transistor 112.

In the embodiment of the present application, the isolated resonant conversion unit 110 may include the following three working modes: a light load mode, a full load mode, and a half load mode. In the half load and full load modes, soft switching may be implemented for the output-side switch transistor 112, in which case the loss is the on loss of the switch transistor, and an on resistance of the switch transistor is much less than an on resistance of its body diode. Therefore, the loss can be greatly reduced compared with applying no synchronization control. In the light load mode, if no synchronization control is applied to the output-side switch transistor 112, the main loss is the on loss of the body diode; and if synchronization control is applied to the output-side switch transistor, the on loss of the switch transistor may be ignored, and in this case, the main loss is the switching loss. In this case, the synchronization start threshold current can be determined by comparing the on loss with the switching loss.

Specifically, $I_d$ is obtained if $P_1=P_2$, and $I_d$ is used as the synchronization start threshold current, where $P_1$ and $P_2$ are respectively the on loss of the body diode and the switching loss of the output-side switch transistor 112, $$P_1 = \frac{1}{T_t}\int_0^{dT_t} I_d^2 dt \times R_{on},$$

and $P_2=\frac{1}{2}\times T_s\times V_d\times I_d\times f$, where $T_t$ is an on time of the body diode, $R_{on}$ is a forward on resistance of the body diode, $I_d$ is a current flowing through the output-side switch transistor 112, $T_s$ is a time at which the body diode and the output-side switch transistor 112 are simultaneously on, $V_d$ is an on voltage of the output-side switch transistor 112, and f is a switching frequency of the output-side switch transistor 112.

Among the above parameters, the on time of the body diode is a known parameter of the switch transistor; the forward on resistance of the body diode is a known parameter of the switch transistor; the current flowing through the output-side switch transistor 112 is the output current in step 210; the time at which the body diode and the output-side switch transistor are simultaneously on is a known parameter of the switch transistor; the on voltage of the output-side switch transistor 112 is the output voltage in step 210; and the switching frequency of the output-side switch transistor 112 is the same as the switching frequency of the input-side switch transistor 111, and is the switching frequency calculated in step 220.

Based on the determined synchronization start threshold current, the synchronization end threshold current can be obtained by subtracting a current difference less than 1 ampere from the synchronization start threshold current. In other words, a current difference between the synchronization start threshold current and the synchronization end threshold current is less than 1 ampere.

In practical applications, the on loss, the switching loss, etc. of the switch transistor can be analyzed, and the current difference between the synchronization start threshold current and the synchronization end threshold current can then be flexibly determined based on an analysis result, which is not limited in the embodiments of the present application.

Figure 7:
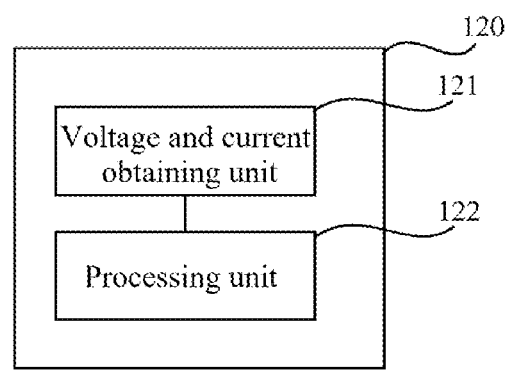
FIG. 7 is a schematic structural diagram of an isolated resonant conversion control apparatus disclosed in an embodiment of the present application.

With reference to FIG. 7, it is a schematic diagram of an isolated resonant conversion control apparatus 120 provided in an embodiment of the present application. The control apparatus includes: a voltage and current obtaining unit 121 and a processing unit 122.

The voltage and current obtaining unit 121 is configured to obtain an output voltage and an output current of an output-side switch transistor 112 of an isolated resonant conversion unit. The processing unit 122 is configured to: calculate a switching frequency of an input-side switch transistor 111 based on the output voltage and the output current; obtain, based on the switching frequency of the input-side switch transistor 111, a turn-on offset time and a turn-off offset time of the output-side switch transistor 112 relative to the input-side switch transistor 111; obtain a duty ratio of a second driving signal based on a duty ratio of a first driving signal, the turn-on offset time and the turn-off offset time, where the first driving signal is used to drive the input-side switch transistor 111; and generate the second driving signal based on the switching frequency of the input-side switch transistor and the duty ratio of the second driving signal, and drive the output-side switch transistor 112 by using the second driving signal.

In the embodiment of the present application, the processing unit 122 is further configured to: obtain a turn-on time point and a turn-off time point for the first driving signal based on the duty ratio of the first driving signal; obtain a turn-on time point for the second driving signal based on the turn-on time point of the first driving signal and the turn-on offset time; obtain a turn-off time point for the second driving signal based on the turn-off time point of the first driving signal and the turn-off offset time; and obtain the duty ratio of the second driving signal based on the turn-on time point of the second driving signal and the turn-off time point of the second driving signal.

In the embodiment of the present application, the processing unit 122 is further configured to: calculate the switching frequency of the input-side switch transistor 111 based on the output voltage and the output current by means of proportional-integral feedback control.

In the embodiment of the present application, the processing unit 122 is further configured to: when the output current is greater than a synchronization start threshold current, obtain, based on the switching frequency of the input-side switch transistor 111, a turn-on offset time and a turn-off offset time of the output-side switch transistor 112 relative to the input-side switch transistor 111.

In the embodiment of the present application, the processing unit 122 is further configured to: determine the synchronization start threshold current based on an on loss of a body diode connected in parallel with the output-side switch transistor 112 and a switching loss of the output-side switch transistor 112.

In the embodiment of the present application, the processing unit 122 is further configured to: obtain $I_d$ if $P_1=P_2$, and use $I_d$ as the synchronization start threshold current, where $P_1$ and $P_2$ are respectively the on loss of the body diode and the switching loss of the output-side switch transistor 112, $$P_1 = \frac{1}{T_t}\int_0^{dT_t} I_d^2 dt \times R_{on},$$

and $P_2=\frac{1}{2}\times T_s\times V_d\times I_d\times f$, where $T_t$ is an on time of the body diode, $R_{on}$ is a forward on resistance of the body diode, $I_d$ is a current flowing through the output-side switch transistor 112, $T_s$ is a time at which the body diode and the output-side switch transistor 112 are simultaneously on, $V_d$ is an on voltage of the output-side switch transistor 112, and f is a switching frequency of the output-side switch transistor 112.

In the embodiment of the present application, the processing unit 122 is further configured to: when the output current is less than a synchronization end threshold current, stop driving the output-side switch transistor 112 of the isolated resonant conversion unit, where the synchronization end threshold current is less than the synchronization start threshold current.

The isolated resonant conversion control apparatus 120 corresponds to the implementation of the isolated resonant conversion control method described in the foregoing embodiment, and is thus not repeated here.

In an embodiment of the present application, there is further provided a computer-readable storage medium storing instructions, where when the instructions are executed by a processor, the isolated resonant conversion control method provided in the embodiments of the present application is performed.

The processor may be an integrated circuit chip having a signal processing capability. The processor may be a general-purpose processor, including a central processing unit (CPU), a network processor (NP), etc.; or it may be a digital signal processor, an application specific integrated circuit, a field-programmable gate array or other programmable logic devices, a discrete gate or transistor logic device, a discrete hardware component, etc. The general-purpose processor may be a microprocessor, or the processor may be any conventional processor, etc.

While the present application has been described with reference to the preferred embodiments, various modifications may be made and equivalents may be provided to substitute for the components thereof without departing from the scope of the present application. In particular, the technical features mentioned in the embodiments can be combined in any manner, as long as there is no structural conflict. The present application is not limited to the specific embodiments disclosed herein, but includes all technical solutions that fall within the scope of the claims.

The invention claimed is:

1. An isolated resonant conversion control apparatus, comprising:
    a voltage and current obtaining unit configured to obtain an output voltage and an output current of an output-side switch transistor of an isolated resonant conversion unit; and
    a processing unit configured to:
        calculate a switching frequency of an input-side switch transistor of the isolated resonant conversion unit based on the output voltage and the output current;
        in response to the output current being greater than a synchronization start threshold current, obtain, based on the switching frequency of the input-side switch transistor, a turn-on offset time and a turn-off offset time of the output-side switch transistor relative to the input-side switch transistor;
        obtain, based on a duty ratio of a first driving signal, the turn-on offset time, and the turn-off offset time, a duty ratio of a second driving signal;
        generate the second driving signal based on the switching frequency of the input-side switch transistor and the duty ratio of the second driving signal; and
        drive the output-side switch transistor by using the second driving signal;
    wherein the first driving signal is used to drive the input-side switch transistor.

2. The isolated resonant conversion control apparatus of claim 1, wherein the processing unit is further configured to:
    obtain a turn-on time point and a turn-off time point for the first driving signal based on the duty ratio of the first driving signal;
    obtain a turn-on time point for the second driving signal based on the turn-on time point of the first driving signal and the turn-on offset time;
    obtain a turn-off time point for the second driving signal based on the turn-off time point of the first driving signal and the turn-off offset time; and
    obtain the duty ratio of the second driving signal based on the turn-on time point of the second driving signal and the turn-off time point of the second driving signal.

3. The isolated resonant conversion control apparatus of claim 1, wherein the processing unit is further configured to:
    calculate the switching frequency of the input-side switch transistor based on the output voltage and the output current by means of proportional-integral feedback control.

4. The isolated resonant conversion control apparatus of claim 1, wherein the processing unit is further configured to:
    determine the synchronization start threshold current based on an on loss of a body diode connected in parallel with the output-side switch transistor and a switching loss of the output-side switch transistor.

5. The isolated resonant conversion control apparatus of claim 4, wherein the processing unit is further configured to:
    obtain $I_d$ at a condition of $P_1=P_2$, and use $I_d$ as the synchronization start threshold current, wherein $P_1$ and $P_2$ are respectively the on loss of the body diode and the switching loss of the output-side switch transistor, $$P_1 = \frac{1}{T_t}\int_0^{dT_t} I_d^2 dt \times R_{on},$$

and $P_2 = \frac{1}{2} \times T_s \times V_d \times I_d \times f$,
wherein $T_t$ is an on time of the body diode, $R_{on}$ is a forward on resistance of the body diode, $I_d$ is a current flowing through the output-side switch transistor, $T_g$ is a time at which the body diode and the output-side switch transistor are simultaneously on, $V_d$ is an on voltage of the output-side switch transistor, and f is a switching frequency of the output-side switch transistor.

6. The isolated resonant conversion control apparatus of claim 1, wherein the processing unit is further configured to:
    in response to the output current being less than a synchronization end threshold current, stop driving the output-side switch transistor of the isolated resonant conversion unit, wherein the synchronization end threshold current is less than the synchronization start threshold current.

7. An isolated resonant conversion control system, comprising:
    an isolated resonant conversion unit, comprising an input-side switch transistor and an output-side switch transistor; and
    an isolated resonant conversion control apparatus configured to drive the input-side switch transistor and the output-side switch transistor, the isolated resonant conversion control apparatus comprising:
        a voltage and current obtaining unit configured to obtain an output voltage and an output current of the output-side switch transistor; and
        a processing unit configured to:
            calculate a switching frequency of the input-side switch transistor based on the output voltage and the output current;
            in response to the output current being greater than a synchronization start threshold current, obtain, based on the switching frequency of the input-side switch transistor, a turn-on offset time and a turn-off offset time of the output-side switch transistor relative to the input-side switch transistor;
            obtain, based on a duty ratio of a first driving signal, the turn-on offset time, and the turn-off offset time, a duty ratio of a second driving signal;
            generate the second driving signal based on the switching frequency of the input-side switch transistor and the duty ratio of the second driving signal; and drive the output-side switch transistor by using the second driving signal;

wherein the first driving signal is used to drive the input-side switch transistor.

8. An isolated resonant conversion control method, comprising:

obtaining an output voltage and an output current of an output-side switch transistor of an isolated resonant conversion unit;

calculating a switching frequency of an input-side switch transistor of the isolated resonant conversion unit based on the output voltage and the output current;

in response to the output current being greater than a synchronization start threshold current, obtaining, based on the switching frequency of the input-side switch transistor, a turn-on offset time and a turn-off offset time of the output-side switch transistor relative to the input-side switch transistor;

obtaining, based on a duty ratio of a first driving signal, the turn-on offset time, and the turn-off offset time, a duty ratio of a second driving signal, wherein the first driving signal is used to drive the input-side switch transistor;

generating the second driving signal based on the switching frequency of the input-side switch transistor and the duty ratio of the second driving signal; and driving the output-side switch transistor of the isolated resonant conversion unit by using the second driving signal.

9. The isolated resonant conversion control method of claim 8, wherein obtaining the duty ratio of the second driving signal based on the duty ratio of the first driving signal, the turn-on offset time, and the turn-off offset time comprises:

obtaining a turn-on time point and a turn-off time point for the first driving signal based on the duty ratio of the first driving signal;

obtaining a turn-on time point for the second driving signal based on the turn-on time point of the first driving signal and the turn-on offset time;

obtaining a turn-off time point for the second driving signal based on the turn-off time point of the first driving signal and the turn-off offset time; and obtaining the duty ratio of the second driving signal based on the turn-on time point of the second driving signal and the turn-off time point of the second driving signal.

10. The isolated resonant conversion control method of claim 8, wherein calculating the switching frequency of the input-side switch transistor based on the output voltage and the output current comprises:

calculating the switching frequency of the input-side switch transistor based on the output voltage and the output current by means of proportional-integral feedback control.

11. The isolated resonant conversion control method of claim 8, further comprising:

determining the synchronization start threshold current based on an on loss of a body diode connected in parallel with the output-side switch transistor and a switching loss of the output-side switch transistor.

12. The isolated resonant conversion control method of claim 11, wherein determining the synchronization start threshold current based on the on loss of the body diode connected in parallel with the output-side switch transistor and the switching loss of the output-side switch transistor comprises:

obtaining $I_d$ at a condition of $P_1=P_2$, and using $I_d$ as the synchronization start threshold current, wherein $P_1$ and $P_2$ are respectively the on loss of the body diode and the switching loss of the output-side switch transistor, $$P_1 = \frac{1}{T_t} \int_0^{dT_t} I_d^2 dt \times R_{on},$$

and $P_2 = \frac{1}{2} \times T_s \times V_d \times I_d \times f$, wherein $T_t$ is an on time of the body diode, $R_{on}$ is a forward on resistance of the body diode, $I_d$ is a current flowing through the output-side switch transistor, $T_g$ is a time at which the body diode and the output-side switch transistor are simultaneously on, $V_d$ is an on voltage of the output-side switch transistor, and f is a switching frequency of the output-side switch transistor.

13. The isolated resonant conversion control method of claim 8, further comprising:

in response to the output current being less than a synchronization end threshold current, stopping driving the output-side switch transistor of the isolated resonant conversion unit, wherein the synchronization end threshold current is less than the synchronization start threshold current.

14. A non-transitory computer-readable storage medium, storing instructions that, when executed by a processor, cause the processor to implement the isolated resonant conversion control method according to claim 8.

* * * * *